US011109614B2

(12) United States Patent
Roehrig

(10) Patent No.: US 11,109,614 B2
(45) Date of Patent: Sep. 7, 2021

(54) FLAVOR DISPENSER DEVICE AND A HEAD MOUNTING DEVICE WITH THE FLAVOR DISPENSER DEVICE

(71) Applicant: Joshua Roehrig, Greenock, PA (US)

(72) Inventor: Joshua Roehrig, Greenock, PA (US)

( * ) Notice: Subject to any disclaimer, the term of this patent is extended or adjusted under 35 U.S.C. 154(b) by 102 days.

(21) Appl. No.: 16/510,889

(22) Filed: Jul. 13, 2019

(65) Prior Publication Data

US 2021/0009378 A1    Jan. 14, 2021

Related U.S. Application Data

(60) Provisional application No. 62/698,281, filed on Jul. 15, 2018.

(51) Int. Cl.
| | | |
|---|---|---|
| *A23L 27/00* | (2016.01) | |
| *B65H 43/08* | (2006.01) | |
| *A63J 25/00* | (2009.01) | |
| *B65H 35/00* | (2006.01) | |
| *B65H 37/00* | (2006.01) | |
| *B65H 35/02* | (2006.01) | |

(52) U.S. Cl.
CPC .............. *A23L 27/79* (2016.08); *A63J 25/00* (2013.01); *B65H 35/006* (2013.01); *B65H 35/0073* (2013.01); *B65H 35/02* (2013.01); *B65H 37/002* (2013.01); *B65H 43/08* (2013.01); *A23V 2002/00* (2013.01)

(58) Field of Classification Search
CPC .. B65H 35/006; B65H 35/0073; B65H 35/02; B65H 37/002; B65H 43/08; A23L 27/79; A63J 25/00; A23V 2002/00
See application file for complete search history.

(56) References Cited

U.S. PATENT DOCUMENTS

| | | | | |
|---|---|---|---|---|
| 3,628,829 | A * | 12/1971 | Heilig | A47C 7/72 297/217.4 |
| 4,629,604 | A | 12/1986 | Spector | |
| 6,169,595 | B1 | 1/2001 | Manne | |
| 6,848,593 | B2 * | 2/2005 | Papp | A61J 7/0084 221/197 |
| 6,962,266 | B2 * | 11/2005 | Morgan | A47L 15/4472 221/25 |
| 8,295,529 | B2 | 10/2012 | Petersen | |
| 8,499,965 | B2 * | 8/2013 | Sheffield | B65H 35/0066 221/45 |
| 10,376,446 | B2 * | 8/2019 | Lee | A61J 7/0418 |
| 2008/0173665 | A1 * | 7/2008 | Oshinski | B65H 3/063 221/259 |
| 2010/0018987 | A1 * | 1/2010 | Hamer | B65D 83/0454 221/25 |
| 2017/0266676 | A1 | 9/2017 | Fateh | |

* cited by examiner

*Primary Examiner* — Ryan A Reis

(57) ABSTRACT

A flavor dispenser device and a head mounting device including the flavor dispenser to enhance the user experience of a motion picture is provided. The flavor dispenser device includes a tape cartridge and a drive mechanism. The tape cartridge includes one or more flavor strips. The drive mechanism advances the tape cartridge inside a first housing, and the one or more flavor strip is dispensed from the first housing in case the drive mechanism is in operation.

5 Claims, 16 Drawing Sheets

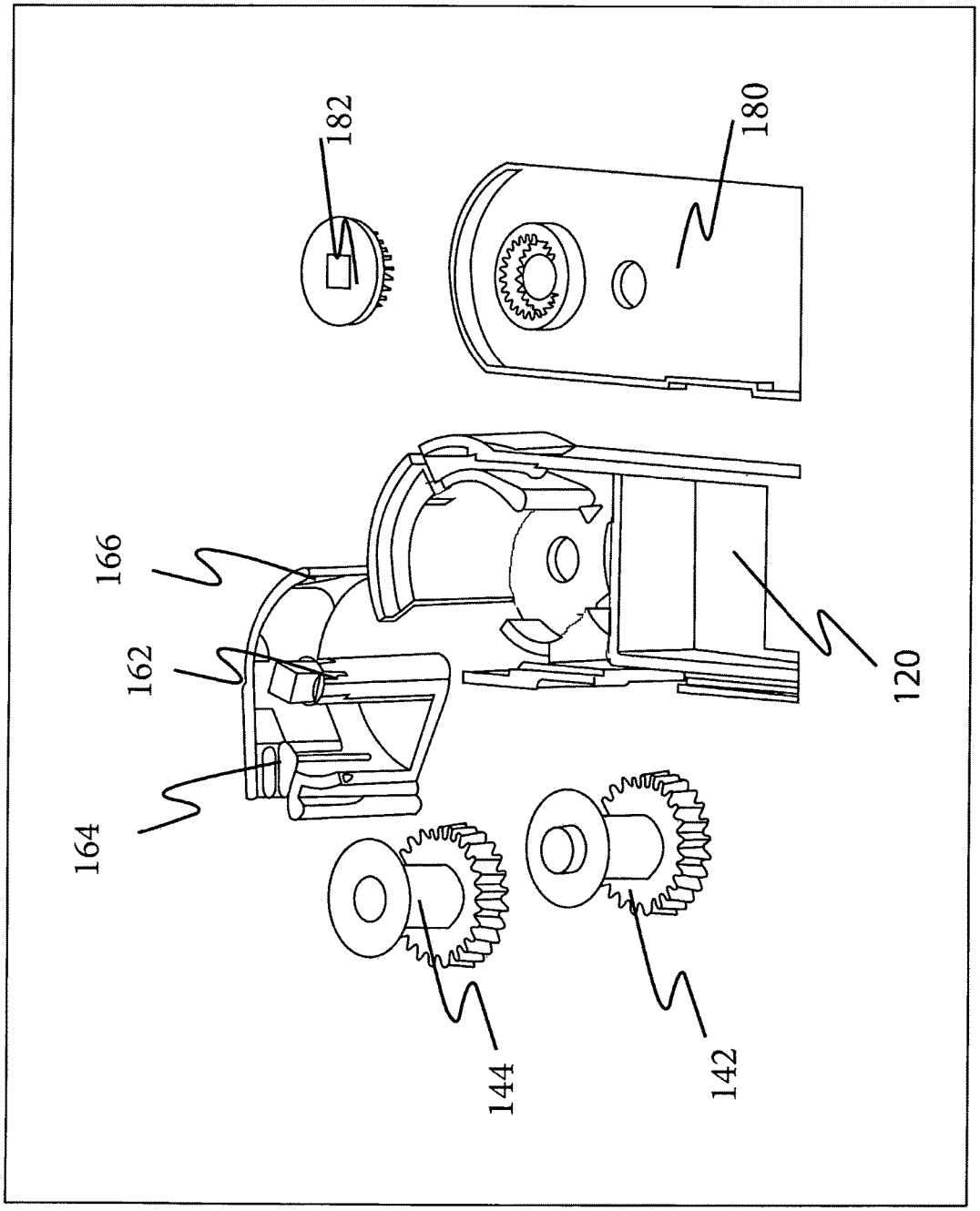
FIG. 4D1

FLAVOR DISPENSER DEVICE AND A HEAD MOUNTING DEVICE WITH THE FLAVOR DISPENSER DEVICE

CROSS REFERENCE TO RELATED APPLICAITONS

This application claims priority to U.S. Provisional Application No. 62/698,281 filed on Jul. 15, 2018 entitled "SYSTEM, METHOD, AND TASTE SENSORY DEVICE FOR SEMI-PRESENT EXPERIENCE THROUGH MOTION PICTURES".

BACKGROUND

Field

In general, the subject matter relates to techniques for enhancing the motion picture viewing experience, more particularly, but not exclusively to a flavor dispenser device for dispensing one or more flavors to a viewer of a motion picture.

Discussion of Related Field

Incorporating additional senses to a motion picture, to enhance the user experience and compliment the conventional audio and visuals information has been under research and development for several years now.

Conventional research is focused more on inclusion of odor or scent to a motion picture. Manne in U.S. Pat. No. 6,169,595 teaches a computer-controlled system coupled with an air compressor to deliver scent individually to each viewer through a tube under the nose. Fateh in US published application 2017/0266676 discloses a head-mounted device that includes means for delivering scents to the wearer near the nose. Petersen in U.S. Pat. No. 8,295,529 discloses a gaming headset that includes ability to deliver olfactory stimulation. Spector in U.S. Pat. No. 4,629,604 teaches a scent cartridge machine that works in conjunction with a video player.

Few other conventional approaches suggest that smell of a food item can trick the mind of a user into tasting the same food, while chewing something else. However, from the user point of view this theory holds true only until the viewer starts chewing the food item, after which the sense of the viewer's taste buds takeover. Thus, conventional prior art fails to propose a solution or solve the problem of enhancing the user experience of a motion picture with respect to the sense of taste.

In view of the forgoing, there is a need for a flavor dispenser that can efficiently solve the above problem and enhance the user experience of watching a motion picture.

SUMMARY

Accordingly, a technique to overcome the above problems is needed. To fulfill this need, a flavor dispenser device and a head mounting device including the flavor dispenser to enhance the user experience of a motion picture is provided. In an embodiment, a flavor dispenser device including a first housing, which in turn comprises a tape cartridge and a drive mechanism. The tape cartridge of the first housing includes one or more flavor strips. The drive mechanism advances the tape cartridge inside the first housing, and the one or more flavor strip is dispensed from the first housing in case the drive mechanism is in operation.

In another embodiment, the flavor dispenser device includes an actuator which is operably coupled to the drive mechanism to actuate the drive mechanism.

In another embodiment, the flavor dispenser device includes a second housing in which the actuator is secured. Further, the second housing is detachably coupled to the first housing such that the actuator is connected to the drive mechanism. The second housing further comprises a photoresistor and a Light Emitting Diode (LED), which are positioned against the tape cartridge when the first housing is connected to the second housing, such that the light emitted by the LED is reflected of the tape cartridge and the reflected light is received by the photoresistor.

In another embodiment, the first housing includes a feeder movably attached to a drive mechanism compartment of the first housing. Further, the one or more flavor strip is dispensed at the feeder for a subject to consume the one or more flavor strip.

In another embodiment, the feeder pivots about the drive mechanism compartment of the first housing, such that the position of the feeder with respect to the first end is adjustable.

In another embodiment, the drive mechanism is positioned in a drive mechanism compartment of the first housing and the tape cartridge is positioned in a cartridge compartment of the first housing. Further, the drive mechanism compartment is relatively closer to a subject's mouth as compared to the cartridge compartment of the first housing.

In another embodiment, the one or more flavor strips are sandwiched between a first film and a second film. The one or more flavor strip is sandwiched by an adhesive and is dispensed one at a time from the first housing.

In another embodiment, the first housing includes a feeder movably attached to a drive mechanism compartment of the first housing. The feeder strips the first film and the second film of the tape cartridge to dispense the one or more flavor strip.

In another embodiment, the drive mechanism comprises a first spool gear and a second spool gear positioned such that the first spool gear drives the second spool gear, and the first spool gear is actuated by the actuator in the second housing.

In another embodiment, the tape cartridge is split into first film and the second film, in the feeder, are spooled at the first spool gear and the second spool gear, respectively. The actuator actuating the first spool gear advances the tape cartridge in the first housing through the feeder.

In another embodiment, the one or more flavor strip is made of an edible material or a dissolvable material.

In an embodiment, a head mounting device is provided. The head mounting device includes a body frame, flavor dispenser device attached to the body frame and a controller operably connected to the flavor dispenser device. The body frame is secured the head mounting device to a to the subject's head. The flavor dispenser device includes a first housing and second housing. The first housing includes a tape cartridge and a drive mechanism. The tape cartridge includes one or more flavor strips and the drive mechanism advances the tape cartridge inside the first housing. The second housing is detachably coupled to the first housing, the second housing comprising an actuator to actuate the drive mechanism. The one or more flavor strip is dispensed from the first housing in case the drive mechanism is in operation. The controller is communicably connected to the actuator to operate the actuator.

In an embodiment, the second housing includes a photoresistor and a Light Emitting Diode (LED), which are positioned against the tape cartridge when the first housing is connected to the second housing, such that the light emitted by the LED is reflected of the tape cartridge and the reflected light is received by the photoresistor. The controller is configured to detect the change in a reflection measurement of the photoresistor; and modify the operation of the actuator.

In an embodiment, the tape cartridge comprises a first film and a second film. The one or more flavor strip is sandwiched between the first film and the second film, and the outer surface of the first film is blue in color and includes one or more black strip.

In an embodiment, the head mounting device includes one or more additional sensory module in addition to the flavor dispenser to enhance the user experience of the motion picture.

Other objects, features, and advantages of the present invention may become apparent from the following detailed description. It shall be understood that, the detailed description and specific examples, while indicating preferred embodiments of the present invention, are given by way of illustration only and various modifications may naturally be performed without deviating from the scope of the present invention.

BRIEF DESCRIPTION OF THE DRAWINGS

Embodiments are illustrated by way of example and not limited by the Figures of the accompanying drawings, in which like references indicate similar elements and in which:

FIG. 4D1 depicts an exemplary exploded view of the first housing 100 without tape cartridge 110, in accordance with an embodiment of the invention;

DETAILED DESCRIPTION

The following detailed description includes references to the accompanying drawings, which form a part of the detailed description. The drawings show illustrations in accordance with example embodiments. These example embodiments are described in enough detail to enable those skilled in the art to practice the present subject matter. However, it will be apparent to one with ordinary skill in the art that the present invention may be practiced without these specific details. In other instances, well-known methods, procedures, components, wiring and circuits have not been described in detail so as not to unnecessarily obscure aspects of the embodiments. The embodiments can be combined, other embodiments can be utilized, or structural, logical modifications can be made without departing from the scope of what is claimed. The following detailed description describes the best mode of the invention and is, therefore, not to be taken as a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclose techniques to enhance the user experience of a viewer watching a motion picture. For example, an embodiment provides a flavor dispenser device and a head mounting device including the flavor dispenser to enhance the user experience of a motion picture. The flavor dispenser device includes a tape cartridge and a drive mechanism. The tape cartridge includes one or more flavor strips. The drive mechanism advances the tape cartridge inside a first housing, and the one or more flavor strip is dispensed from the first housing in case the drive mechanism is in operation.

Structure of the Feeder Dispenser Device 1000

Figure 1:
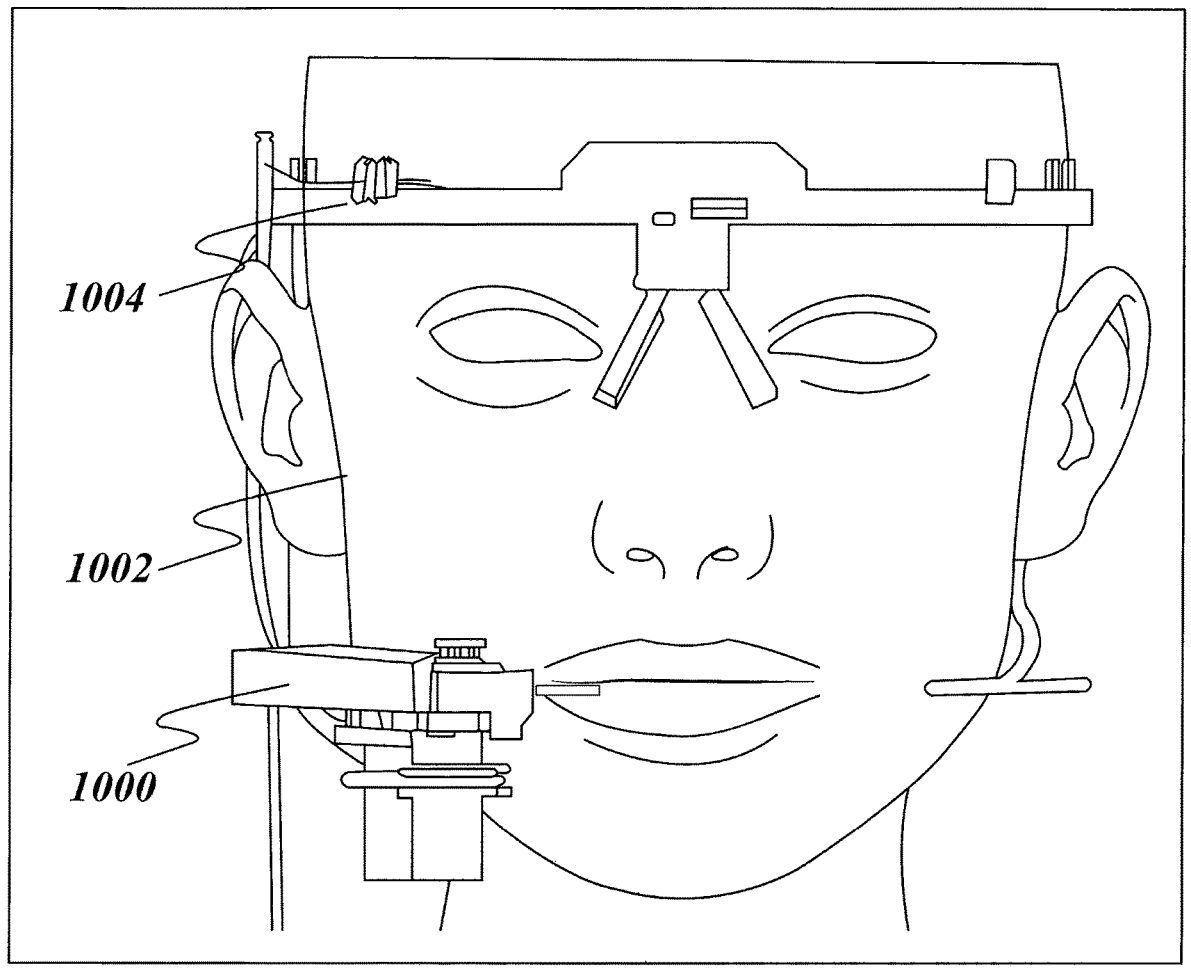
FIG. 1 depicts an exemplary view of a head mounting device 1004 with a flavor dispenser device 1000 secured to a subject 1002, in accordance with an embodiment of the invention.

FIG. 1 depicts an exemplary view of a head mounting device 1004 with a flavor dispenser device 1000 secured to a subject 1002, in accordance with an embodiment of the invention. The operation of the flavor dispenser device 1000 is controlled by a controller 1006 (not shown in the FIGS.). As depicted in the instant figure, the flavor dispenser device 1000 is connected to the head mounting device 1004, which is secured to the head of the subject 1002. The flavor dispenser device 1000 is positioned close to the mouth of the subject 1002, such that the dispensed flavors may be consumed by the subject 1002. In an embodiment, the head mounting device 1004 may include one or more additional modules to enhance the user experience of the subject 1002 watching a motion picture or playing a video game.

Figure 2A:
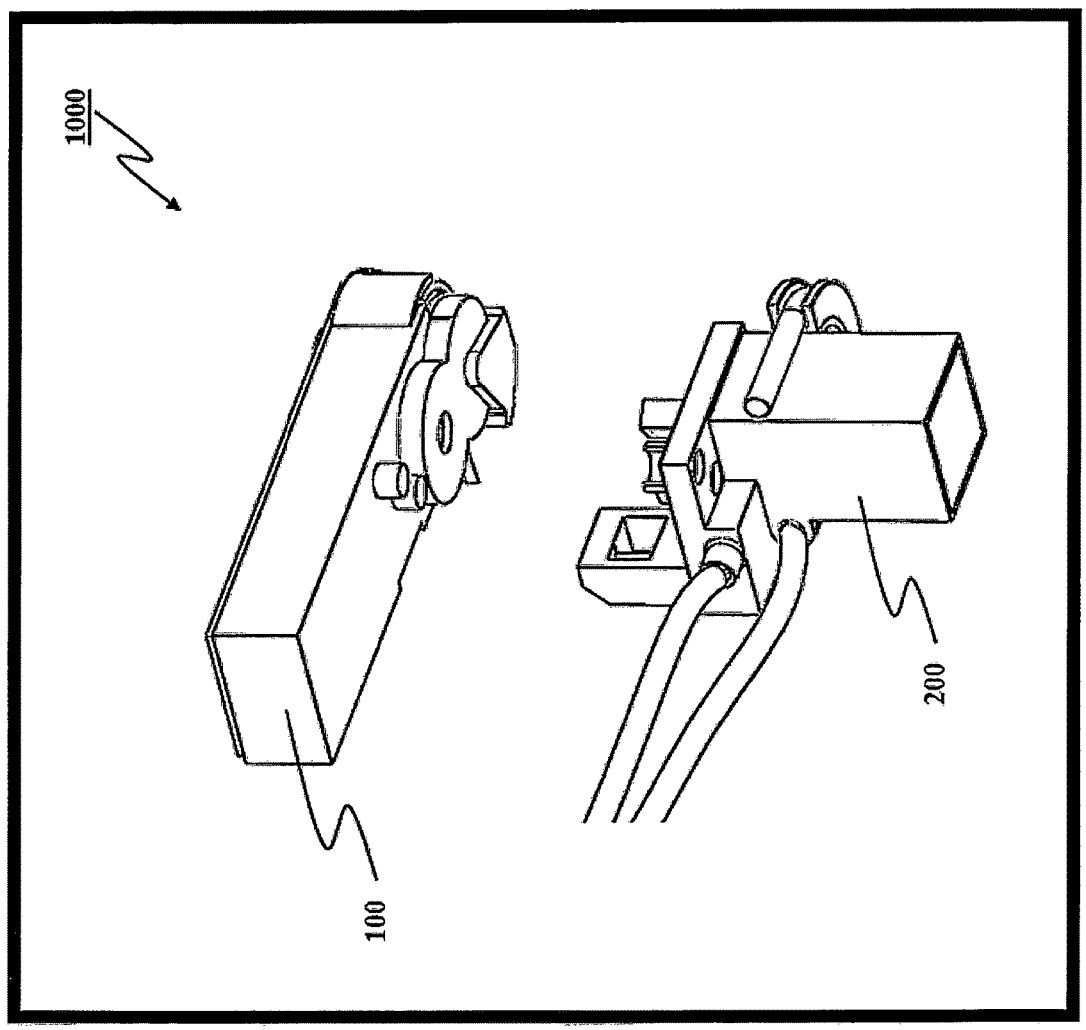
FIGS. 2A-2C depicts exemplary views of a first housing 100 and a second housing 200 of the flavor dispenser device 1000 in disengaged position, in accordance with an embodiment of the invention.
Figure 2B:
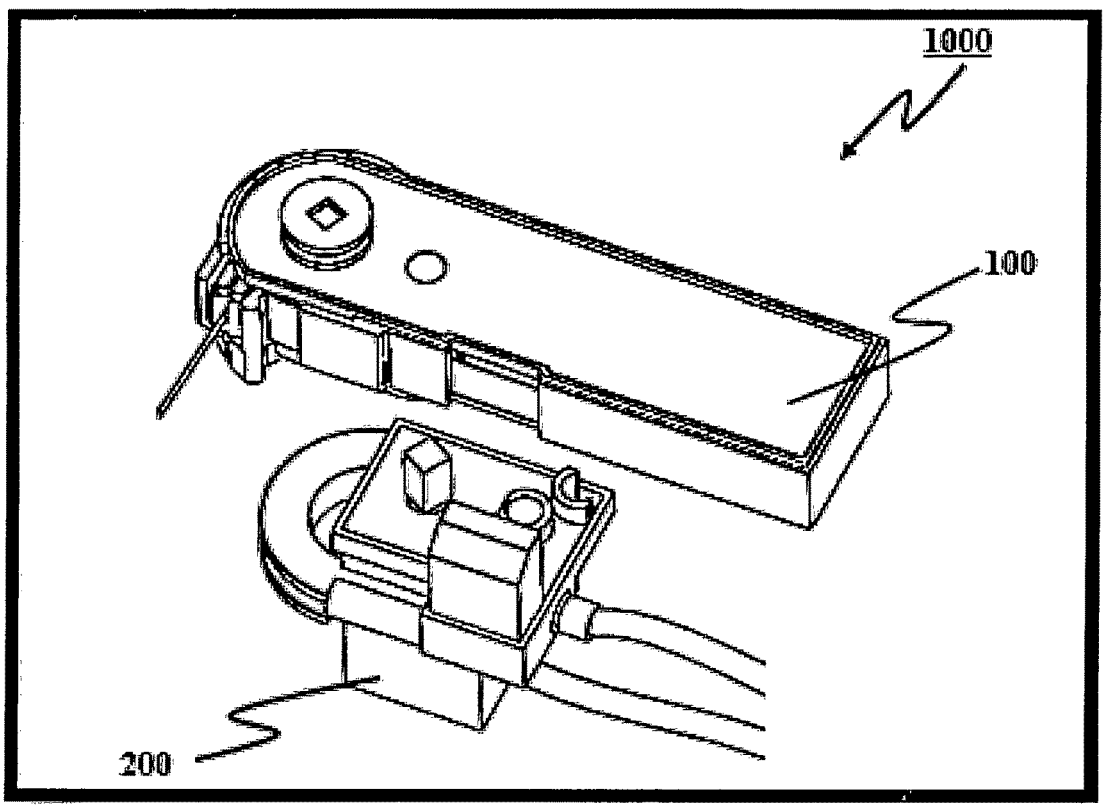
Figure 2C:
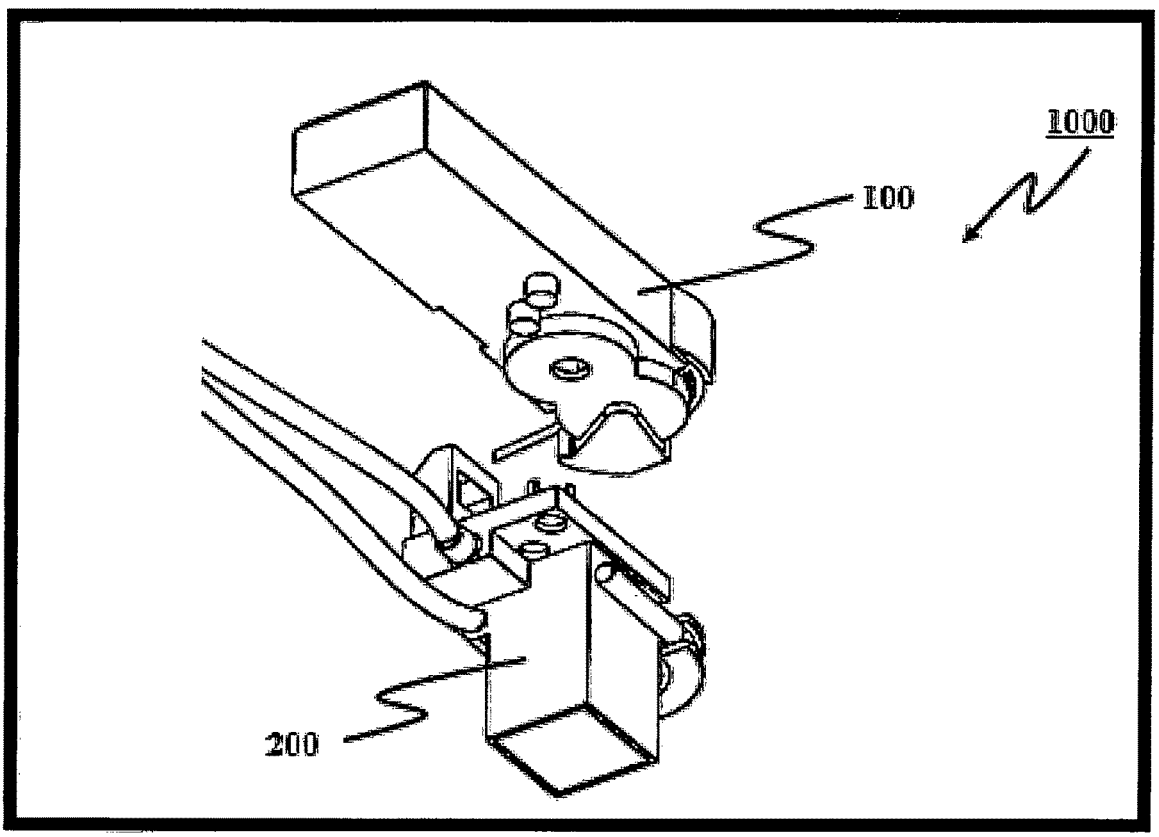

FIGS. 2A-2C depicts exemplary views of a first housing 100 and a second housing 200 of the flavor dispenser device 1000 in disengaged position, in accordance with an embodiment of the invention. As depicted in the above figures the flavor dispenser device 1000 includes the first housing 100 and the second housing 200. The first housing 100 and the second housing 200 are detachably connected. For example, the figures depict one exemplary way of detachably connecting the first housing 100 and the second housing 200 through one or more protrusion and one or more recess on the bottom surface of the first housing 100 and the top surface of the second housing 200.

Figure 3A:
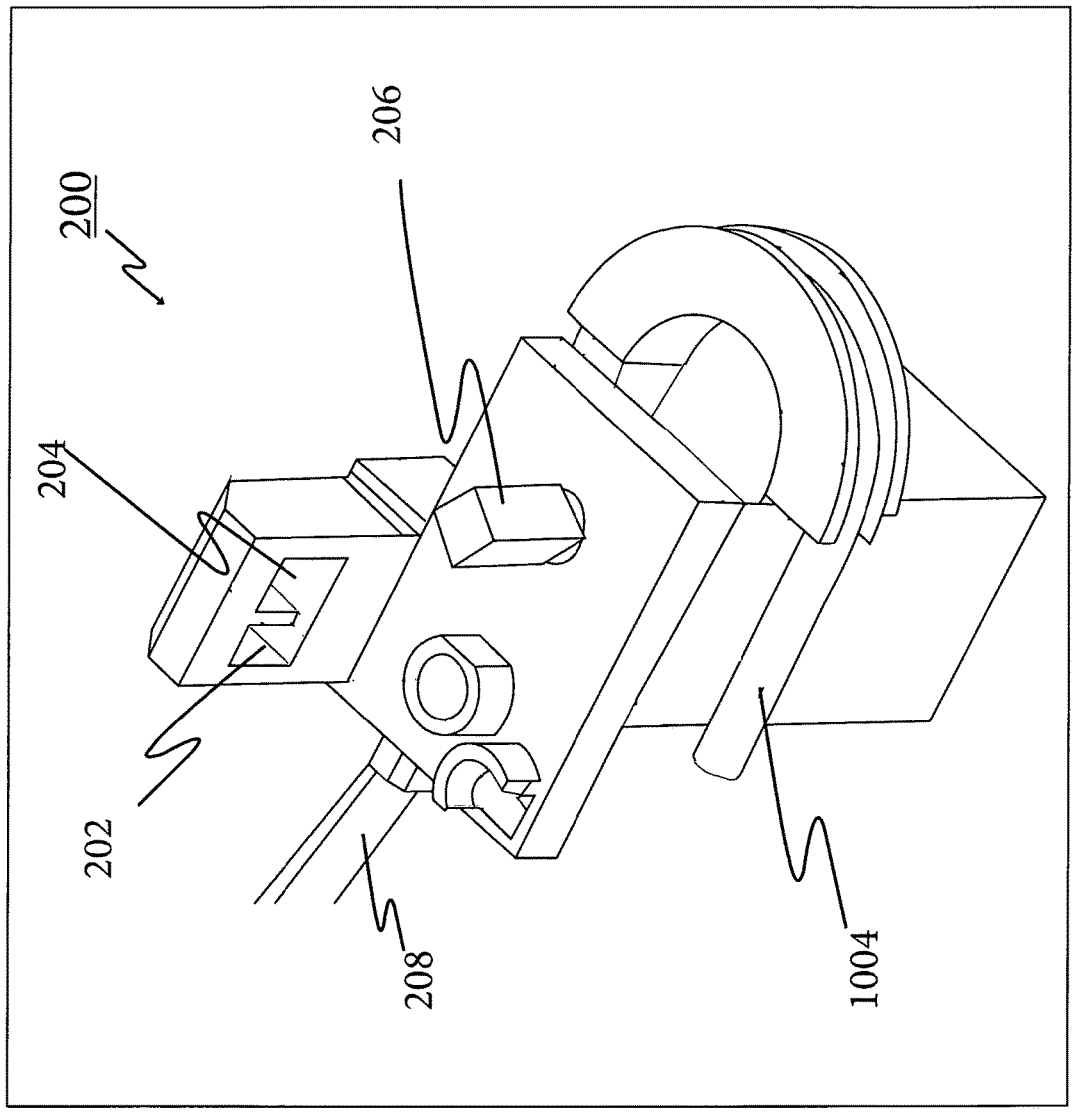
FIGS. 3A & 3B depicts exemplary views of the second housing 200 in accordance with an embodiment of the invention.
Figure 3B:
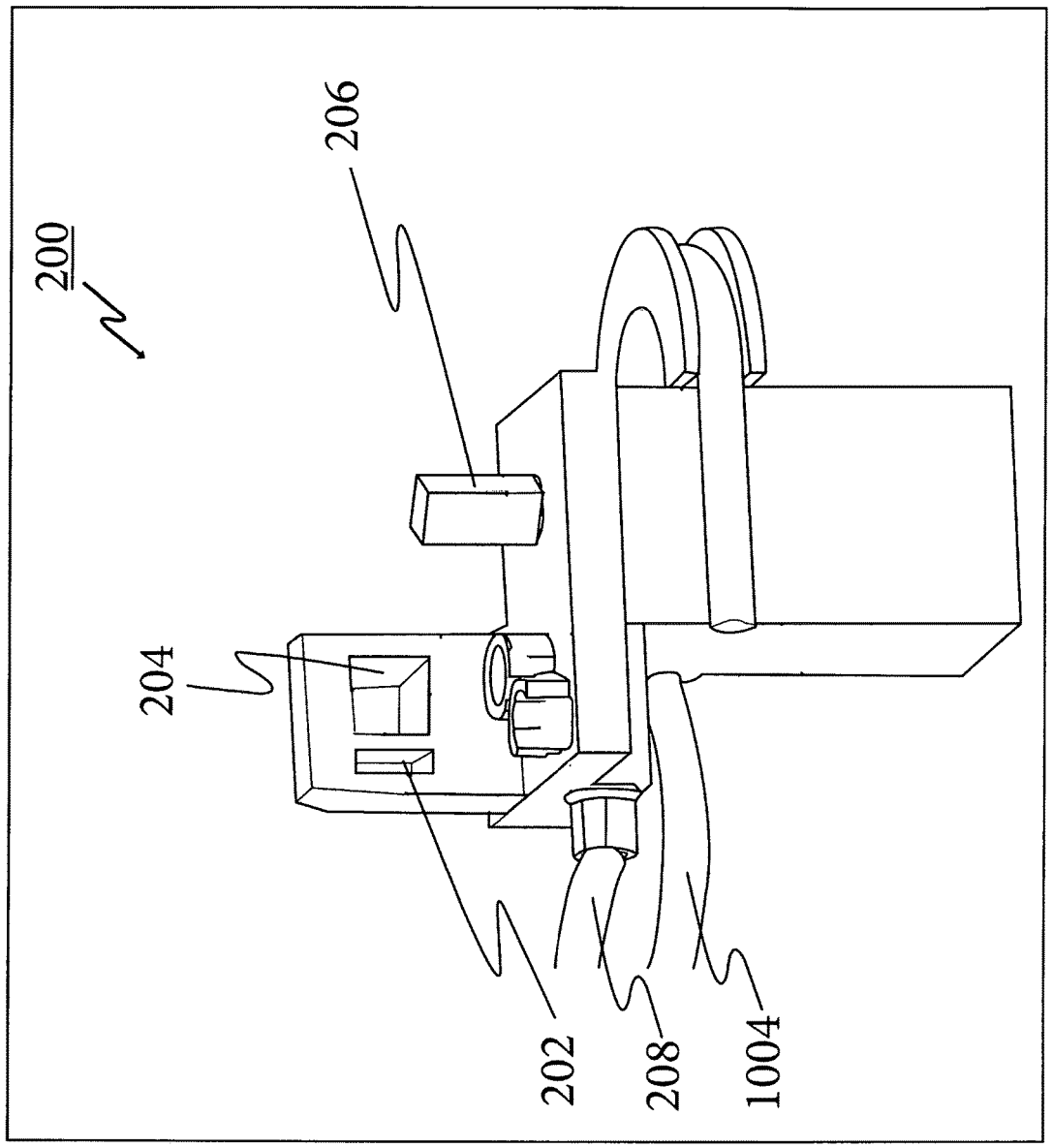

FIGS. 3A & 3B depicts exemplary views of the second housing 200 in accordance with an embodiment of the invention. The second housing 200 may be connected to the body frame of the head mounting device 1004 as shown in the figures. The second housing 200 is connected to the head mounting device 1004 such that, the position of the second housing 200 with respect to the subject 1002 may be adjusted and then locked. A lead cable 208 connects the controller 1006 to the second housing 200. Alternatively, the controller 1006 may be attached directly to the second housing 200 or may be positioned inside the second housing 200 to achieve a compact design depending on the use case.

The second housing 200 includes an actuator, a photoresistor and a Light Emitting Diode (LED), which are operably connected to the controller 1006 through the lead cable 208. The actuator (not shown in the figures) is positioned inside the second housing 200. The photoresistor resistor is positioned inside a compartment 204, and the LED is positioned inside a compartment 202. In an embodiment, the compartments 202 and 204 are positioned such that at least a part of the reflected light from the LED in compartment 202 is captured by the photoresistor in the compartment 204. In an embodiment, the LED and the photoresistor may be replaced by an infrared diode and infrared receiver in the compartment 202 and compartment 204, respectively.

Figure 3C:
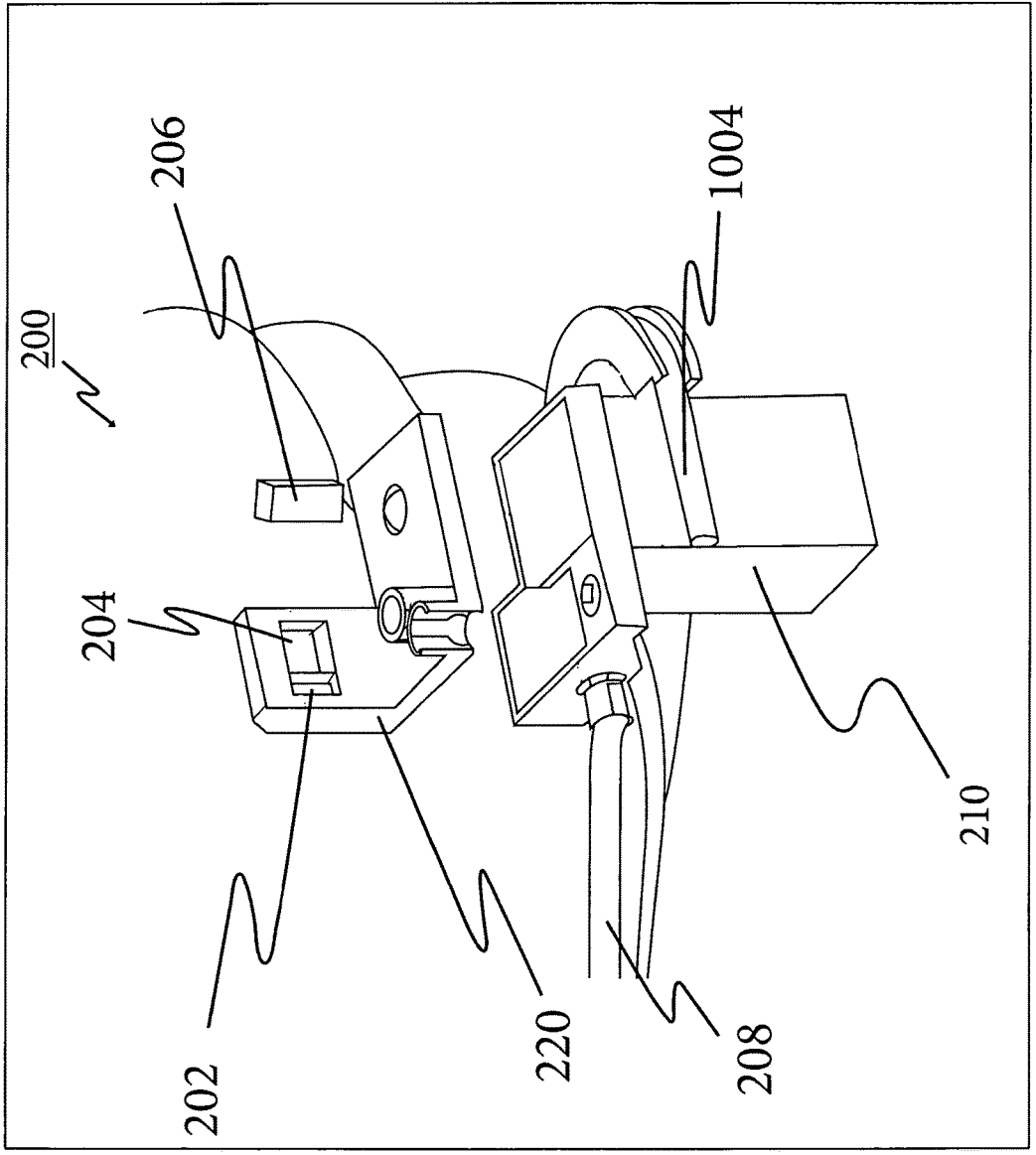
FIG. 3C illustrates an exploded view of the second housing 200 in accordance with an embodiment of the invention.

FIG. 3C illustrates an exploded view of the second housing 200 in accordance with an embodiment of the invention. The second housing is formed by connecting the first section 210 and the second section 220. The first section 210 houses the actuator and the second section 220 houses the compartment 202 and the compartment 204 for holding the LED and the photoresistor, respectively. An extension shaft 206 is connected to the shaft of the actuator in the first section 210. The second section 220 (also referred to as "top surface" of the second housing 200) as depicted in the figures may include one or more recess to receive the first housing 100.

Figure 4A:
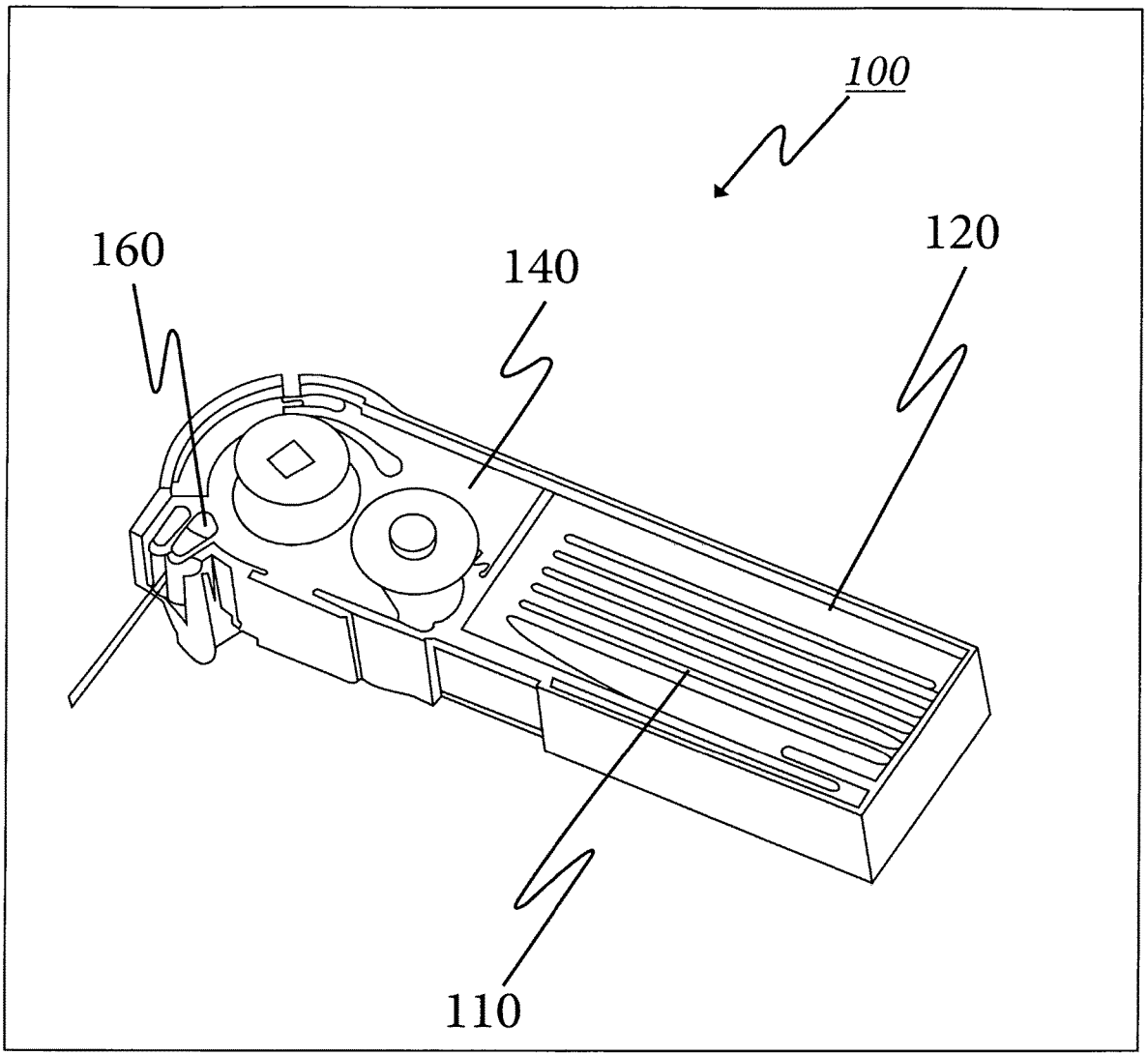
FIG. 4A depicts an exemplary view of the first housing 100 without a lid 180, in accordance with an embodiment of the invention.
Figure 4B:
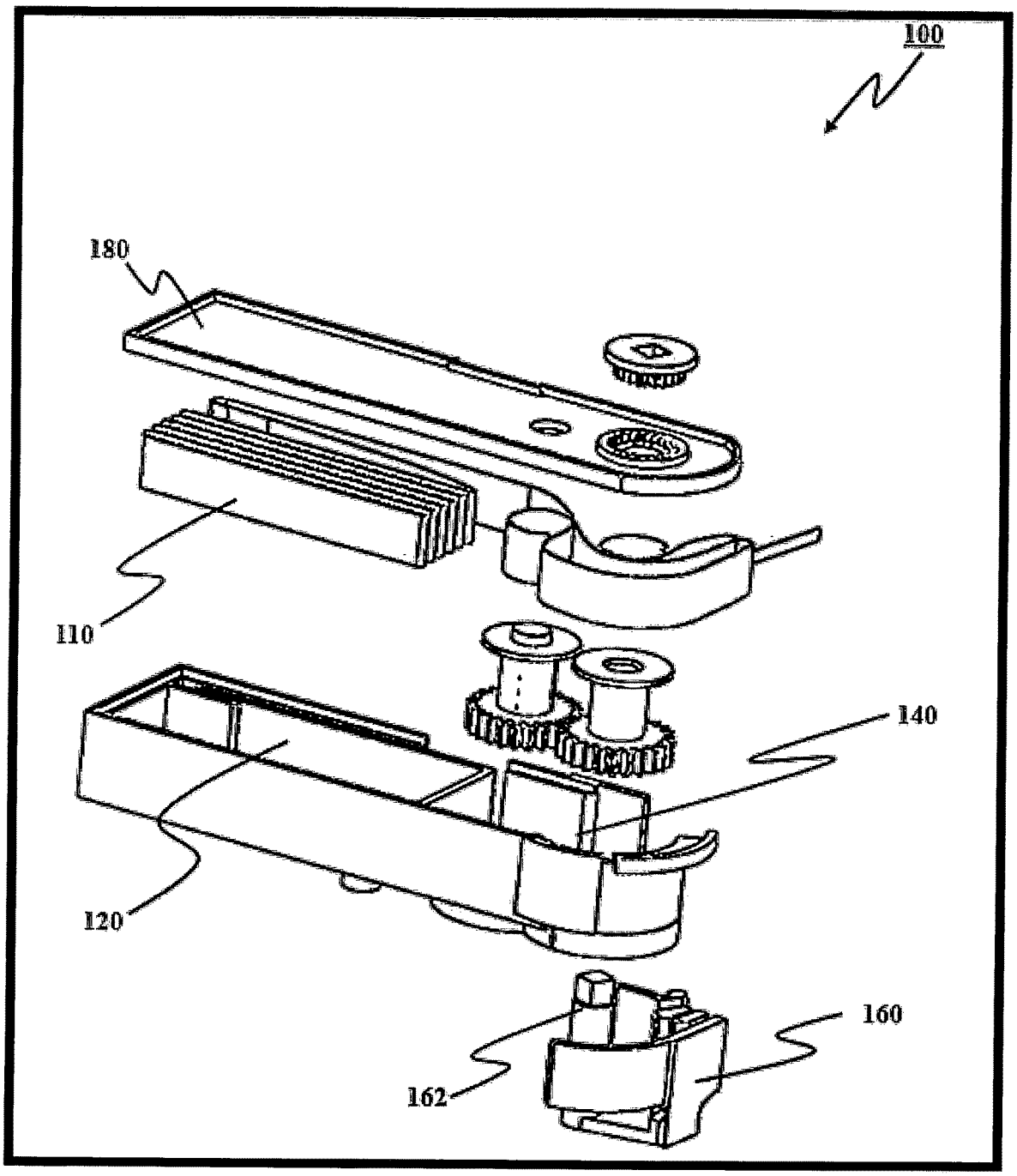
FIG. 4B depicts an exemplary exploded view of the first housing 100, in accordance with an embodiment of the invention.

FIG. 4A depicts an exemplary view of the first housing 100 without a lid 180, in accordance with an embodiment of the invention. The first housing 100 includes a cartridge compartment 120, a drive mechanism compartment 140, a feeder 160, and the lid 180. FIG. 4B depicts an exemplary exploded view of the first housing 100, in accordance with an embodiment of the invention. The cartridge compartment 120 includes a tape cartridge 110.

Figure 5A:
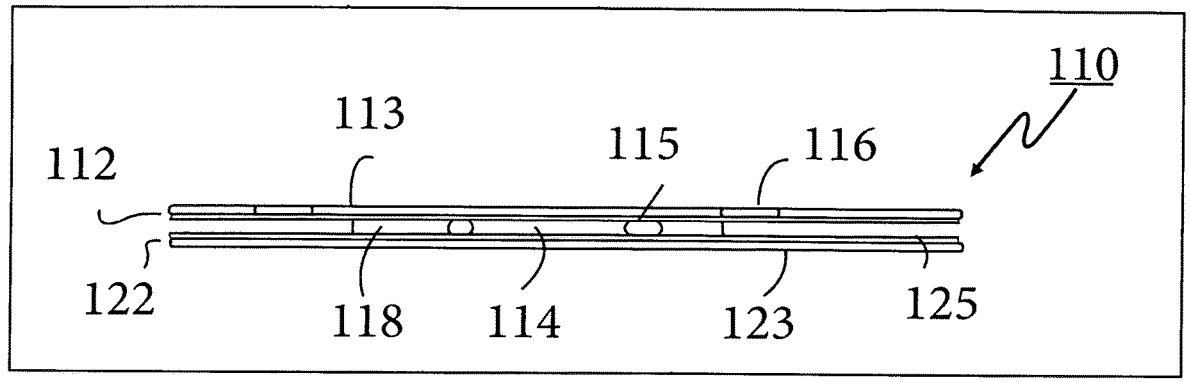
FIG. 5A illustrates a cross-sectional view of the tape cartridge 110, in accordance with an embodiment of the invention.
Figure 5B:
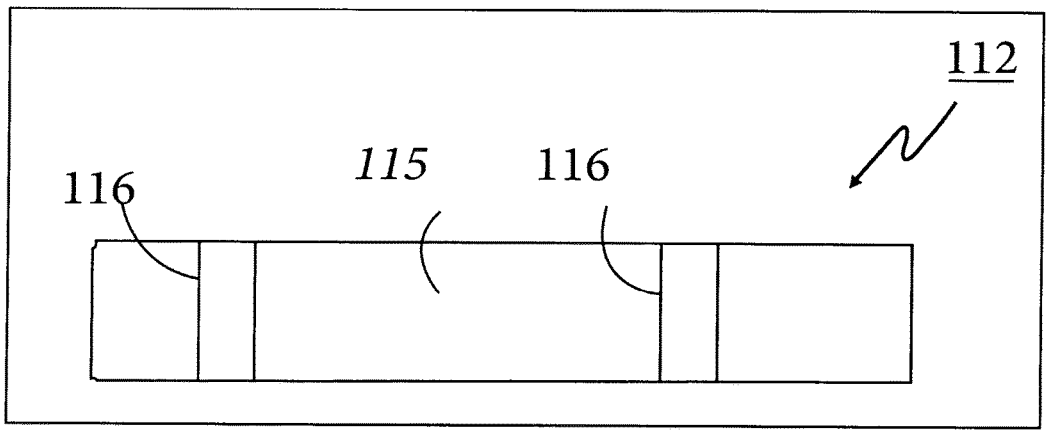
FIG. 5B illustrates the outer surface 113 of the first film 112 of the tape cartridge 110, in accordance with an embodiment of the invention.

FIG. 5A illustrates a cross-sectional view of the tape cartridge 110, in accordance with an embodiment of the invention. The tape cartridge 110 include a first film 112 and second film 122. The first film 112 has an outer surface 113 and an inner surface 115. The outer surface 113 may be blue in color, and the inner surface 115 may be silver in color, as depicted in the FIGS. 5B & 5C. As depicted in FIG. 5B, the first film may include one or more black strip 116 on its outer surface 113.

Figure 5C:
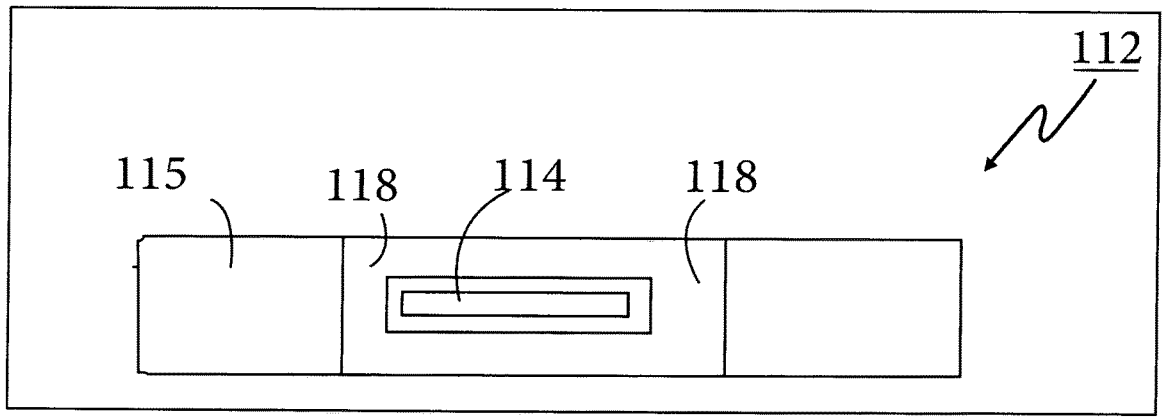
FIG. 5C illustrates the inner surface 115 of the first film 112 of the tape cartridge 110, in accordance with an embodiment of the invention.

FIG. 5C illustrates the inner surface 115 of the first film 112 of the tape cartridge 110, in accordance with an embodiment of the invention. The inner surface 115 of the first film 112 may be silver in color, and a flavor strip 114 is positioned on the inner surface 115 using an adhesive 118. In an embodiment the position of the flavor strip 114 on the inner surface 115 is in between two successive black strip 116 on the outer surface 113 of the first film 112, as depicted in FIG. 5A. In an exemplary embodiment, the adhesive 118 may be rectangular in shape and the flavor strip 114 is positioned on the rectangular adhesive 118.

The second film 122 has an outer surface 123 and an inner surface 125. The outer surface 123 may be blue in color, and the inner surface 125 may be silver in color. The inner surface 125 of the second film 122 is pressed directly to the adhesive 118 on the first film, such that the flavor strip 114 is sandwiched between the first film 112 and the second film 122. In an embodiment, the flavor strip 114 may be made of an edible material or a dissolvable material.

Referring to FIG. 4B, the drive mechanism compartment 140 may include a mechanism (also referred to as "drive mechanism") to advance the tape cartridge 110 from the cartridge compartment and dispense the flavor strip 114. Further the drive mechanism compartment 140 may collect the first film 112 and second film 122 of the tape cartridge 110, which may be split at the feeder 160.

Figure 4C:
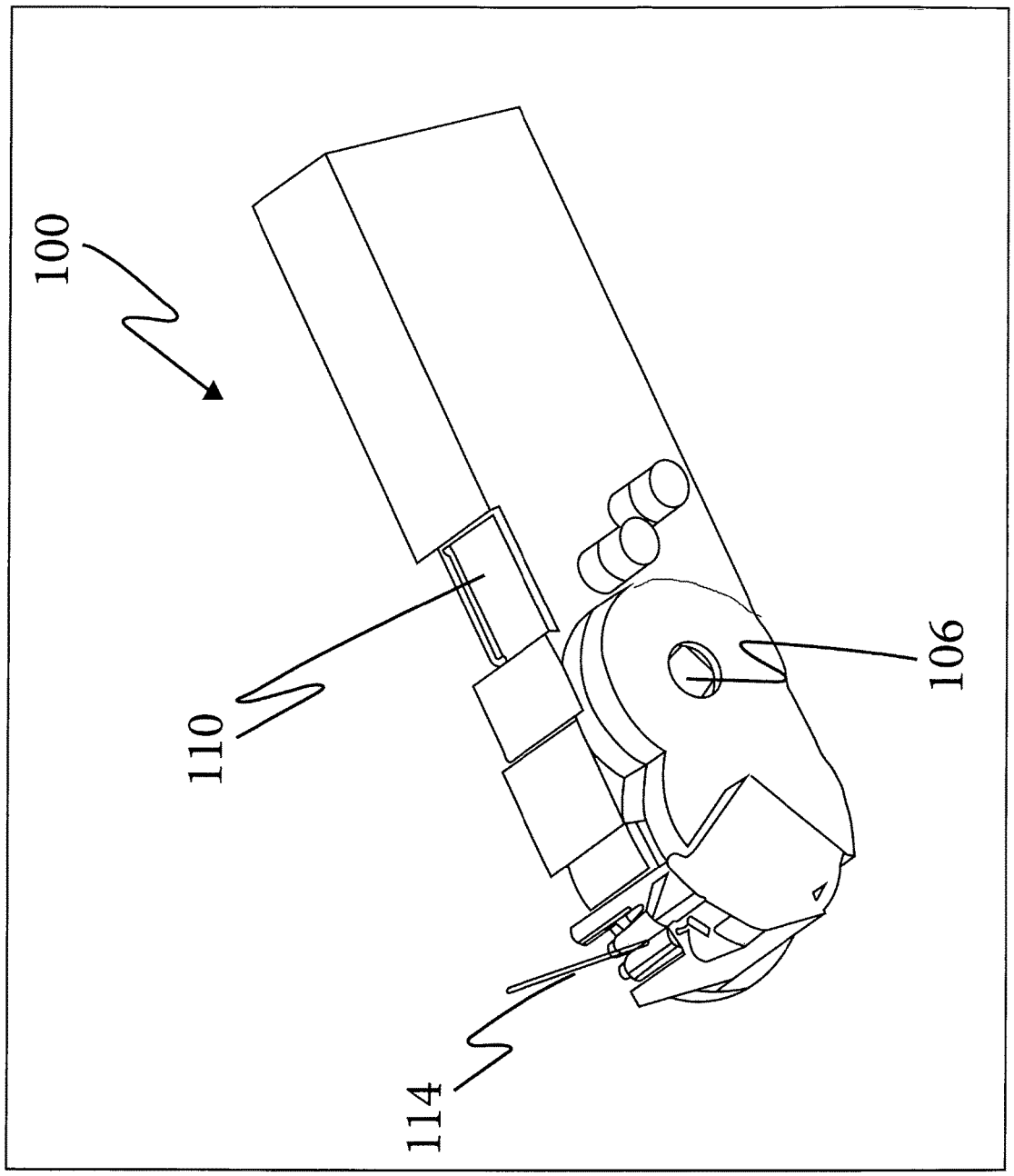
FIG. 4C depicts an exemplary bottom view of the first housing 100, in accordance with an embodiment of the invention.
Figure 4D:
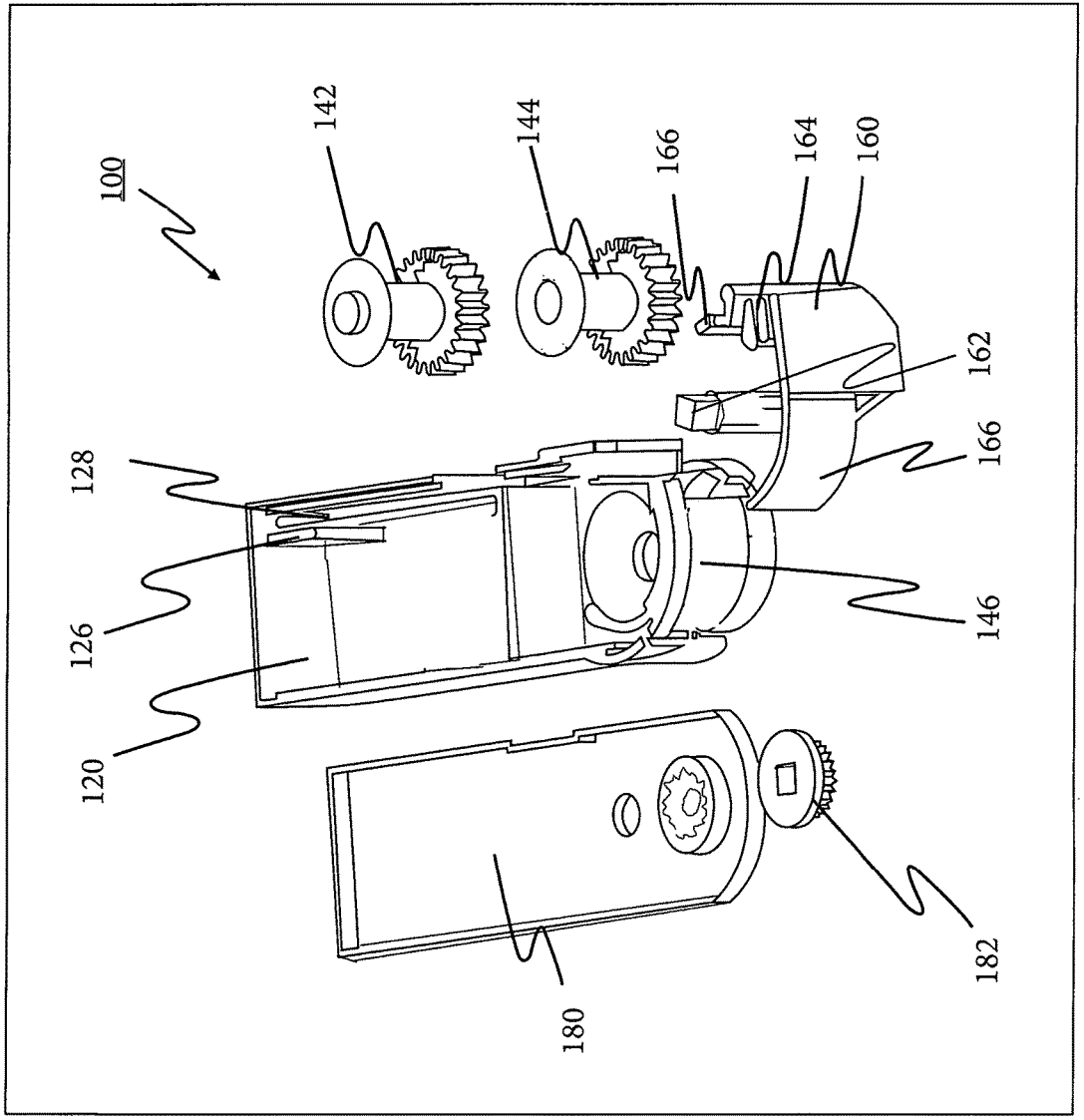
FIG. 4D depicts an exemplary exploded view of the first housing 100 without tape cartridge 110, in accordance with an embodiment of the invention.

FIG. 4D illustrates another view of first housing 100 without the tape cartridge 110, in accordance with an embodiment of the invention. The drive mechanism may include a first spool gear 142 and a second spool gear 144, which are positioned such that, the actuator in the first section 210 actuate the first spool gear 142. Further, the position of the second spool gear 144 in the drive mechanism compartment 140 is such that, the first spool gear 142 drives the second spool gear 144, as depicted in the FIGS. 4E & 4F.

Figure 6A:
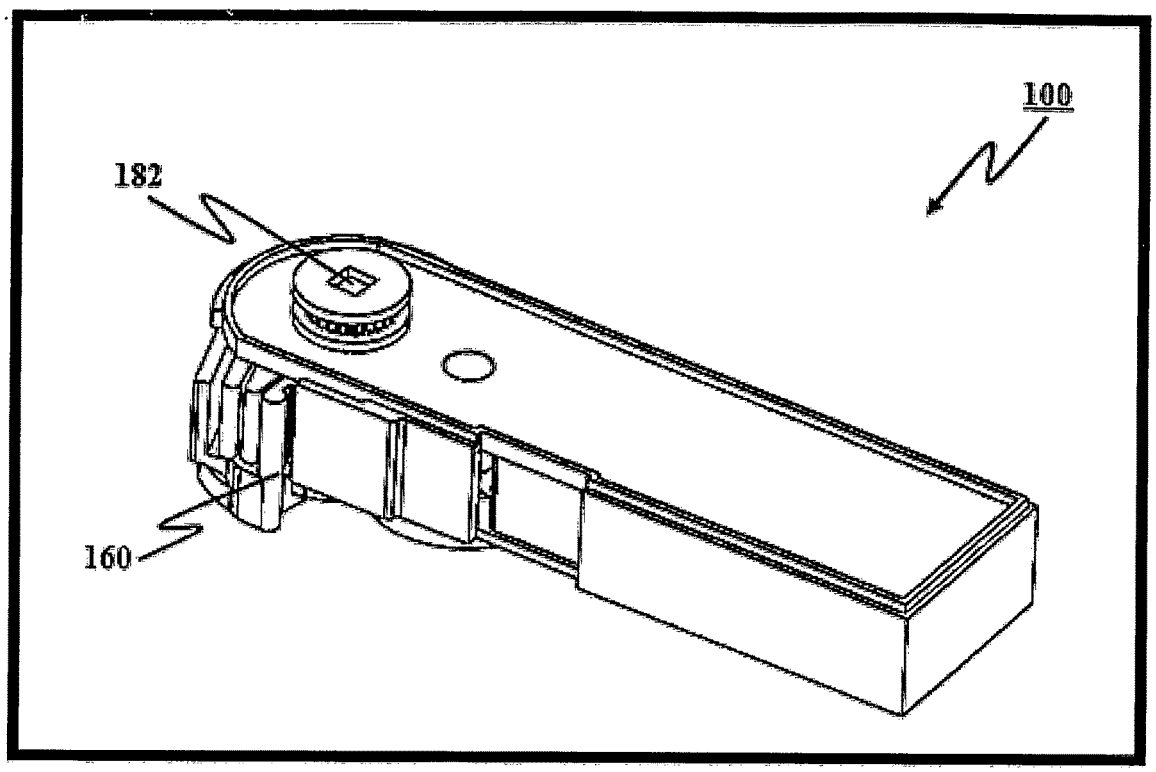
FIGS. 6A & 6B illustrates the feeder 160 pivoting about the second spool gear 144, in accordance with an embodiment of the invention.
Figure 6B:
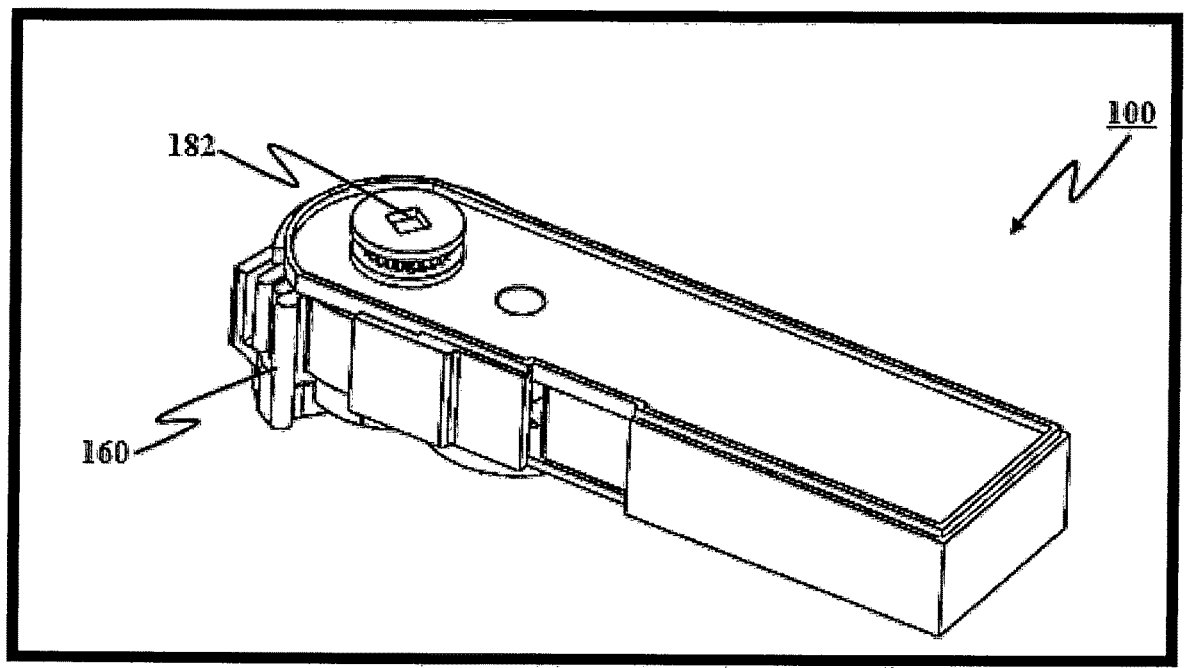
Figure 7:
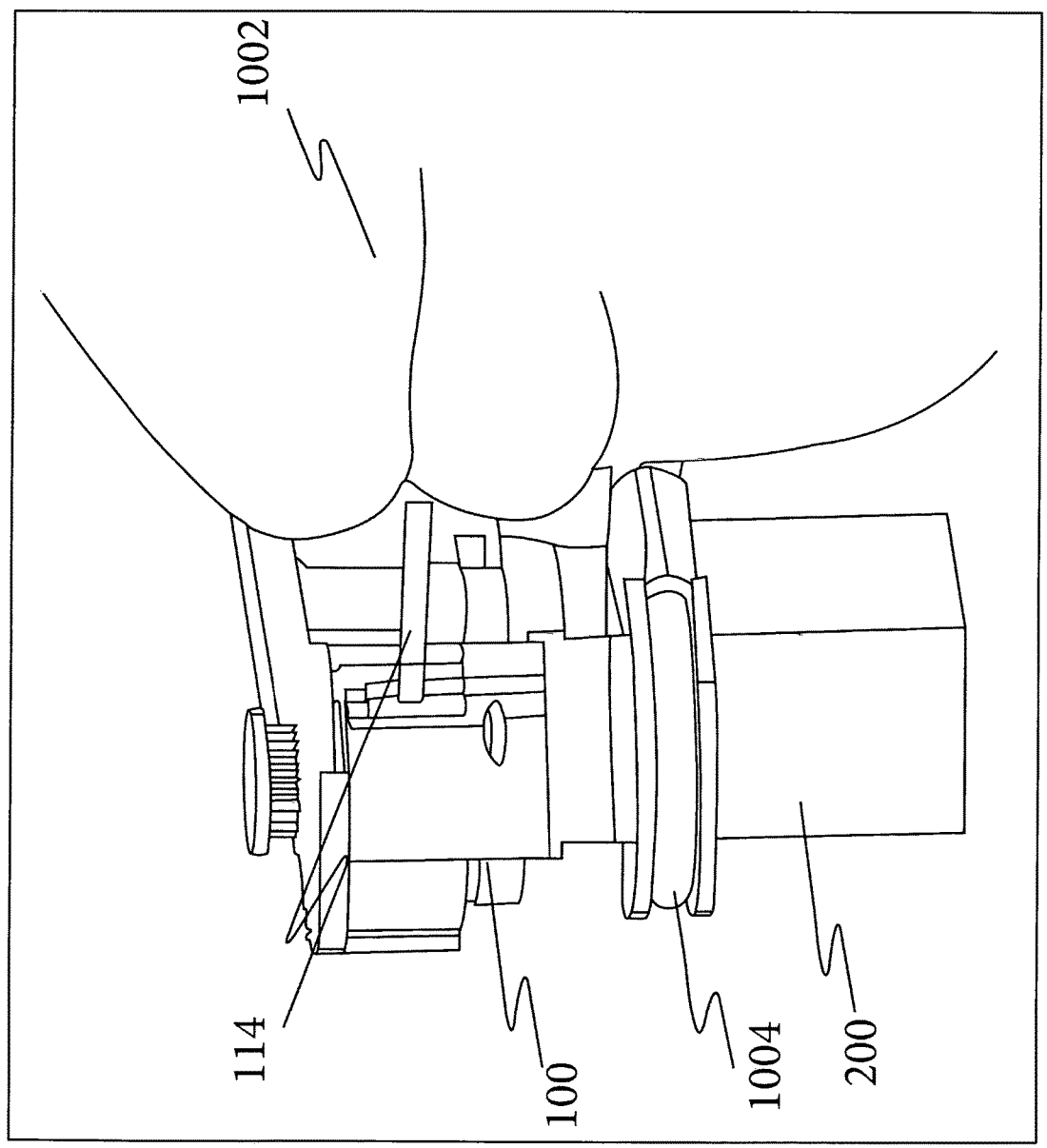
FIG. 7 depicts an exemplary view of the flavor dispenser device 1000 dispensing a flavor strip close to the mouth of a subject 1002, in accordance with an embodiment of the invention.

Referring to the FIGS. 4B, 4D & 4D1, the feeder 160 of the first housing 100 includes a pair of splitters 164, a pivot button male 162 and a shield 166. The feeder 160 splits the tape cartridge 110 at the pair of splitters 164 and dispenses the flavor strip 114 close to the mouth of the subject 1002, as depicted in FIG. 7. The shield 166 may protect the subject 1002 from the advancing tape cartridge 110. The pivot button male 162 is received by the hollow second spool gear 144, as depicted in the FIG. 4F. The pivot button male 162 extents through the second spool gear 144 till the top of the lid 180. The pivot button male 160 may be connected to the pivot button 182, as shown in FIGS. 6A & 6B to prevent the feeder 160 from pivoting when the drive mechanism is in operation. The lid 180 may be press fitted to the first housing to secure the position of all the internal parts of the first housing 100.

FIGS. 6A & 6B illustrates the feeder 160 pivoting about the second spool gear 144, in accordance with an embodiment of the invention. The feeder 160 may be pivoted about the second spool gear 144 through the pivot button male 162 secured inside the hollow second spool gear 144. The subject 1002 may adjust the position of the feeder 160 as per the subject's 1002 comfort to consume the dispensed flavor strip 114. The flavor strip 114 is dispensed at the feeder 160 close to the mouth of the subject 1002. The position of the feeder 160 with respect to first housing 100 in FIG. 6A is different from the position of the feeder 160 with respect to first housing 100 in FIG. 6B.

Movement of the Tape Cartridge 110 within the First Housing 100

Figure 4E:
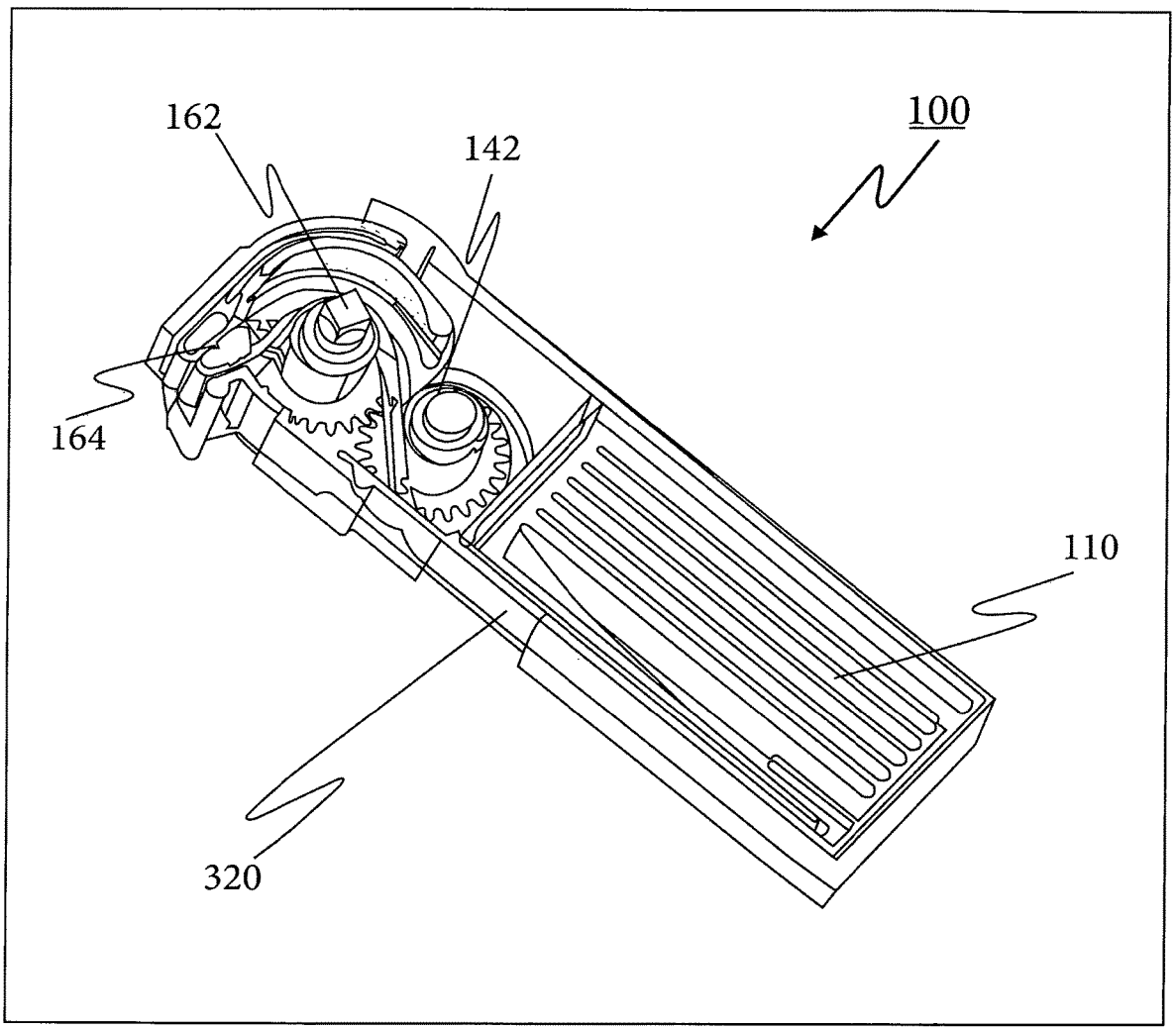
FIG. 4E depicts an exemplary view of the first housing 100 without a lid 180, in accordance with an embodiment of the invention.
Figure 4F:
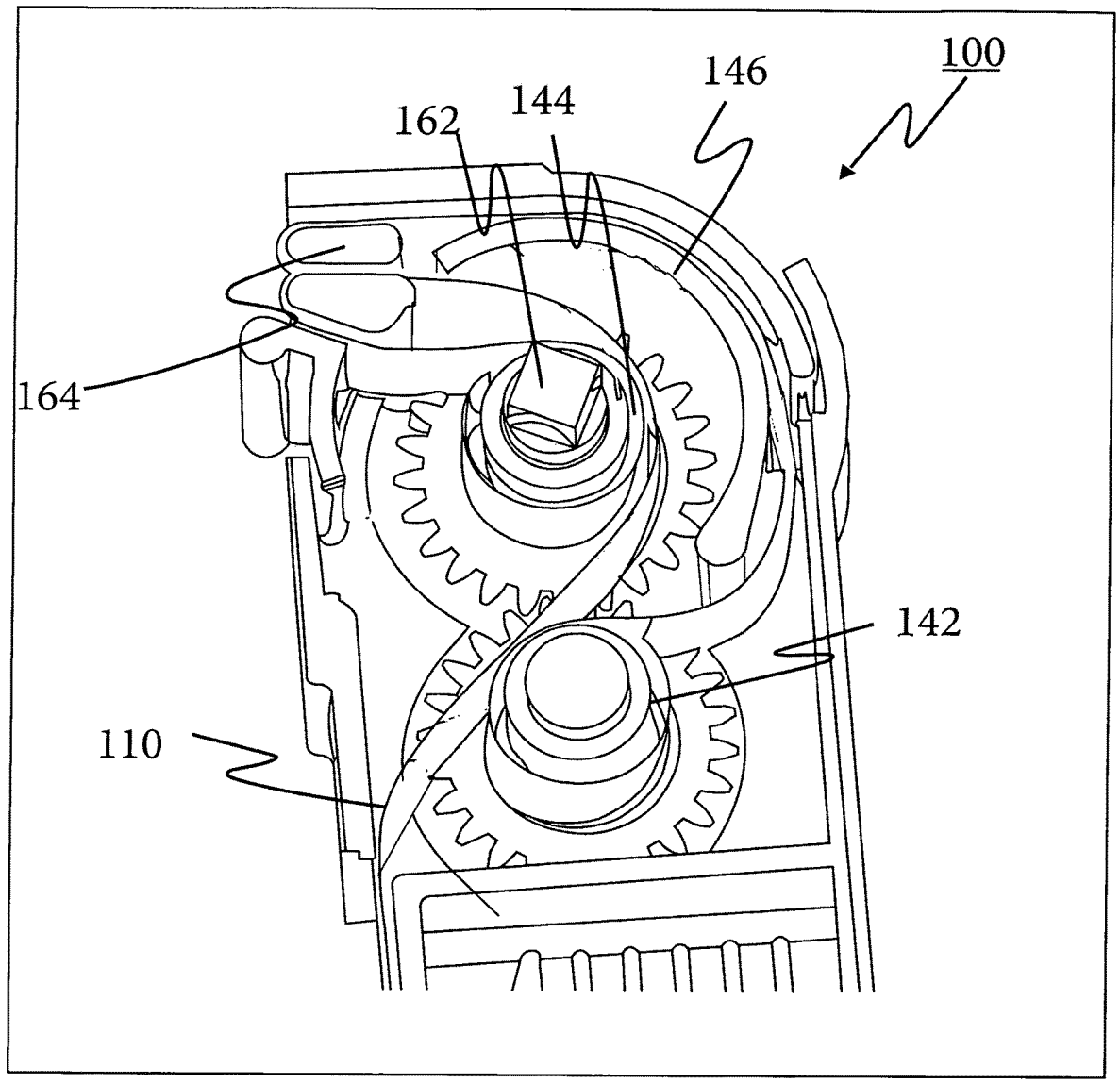
FIG. 4F depicts an exemplary view of the drive mechanism compartment 140 of the first housing 100, in accordance with an embodiment of the invention.

Referring to the FIGS. 4E & 4F, the tape cartridge 110 is secured in the cartridge compartment 120. In an exemplary embodiment, the tape cartridge 110 may be folded in a zig-zag pattern within the cartridge compartment, as depicted in the figures. Alternatively, other configurations like circular folding, among others may also be implemented and are within the scope of this invention.

Further, the tape cartridge passes through a wall 128 (refer to FIG. 4D) in the cartridge compartment 120 directed towards the drive mechanism compartment 140 via an exposed area 320 (refer to FIG. 4E). The wall 128 in the cartridge compartment 120 may prevent the tape cartridge 110 from folding. The slip resist wall 126 (refer to FIG. 4D) creates tension on the tape cartridge 110 and prevents the taste cartridge from slipping more layers then required into the exposed area 320.

Further, as depicted in the FIG. 4F, the tape cartridge 110 in the drive mechanism compartment 140 passes diagonally between the first spool gear 142 and the second spool gear 144 to the pair of splitters 164 of the feeder 160. The pair of splitters 164 splits the tape cartridge 110 in to first film 112 and the second film 122 thereby dispensing the sandwiched flavor strip 114 in the tape cartridge 110.

Further, the second film 122 is channeled for spooling through a return wall 146 (refer to FIG. 4F) at the first spool gear 142. The return wall 146 is positioned in the drive mechanism compartment 140 to facilitate smooth flow of the second film 122 at the pair of splitters 164. The return wall 146 may prevent jamming of the striped second film 122 inside the drive mechanism compartment 140. One end of the second film 122 is connected to the first spool gear 142 through the return wall 146, before the flavor dispenser is in operation. The one end of the second film 122 may be connected using an adhesive to the first spool gear 142.

Further, the first film 112 is channeled for spooling at the second spool gear 144. One end of the first film 112 is connected to the second spool gear 144 before the flavor dispenser is in operation. The one end of the first film 112 may be connected using an adhesive to the second spool gear 144.

Operation of the Flavor Dispenser Device 1000

The extension shaft 206 is connected to the first spool gear 142 through an aperture 106 (refer to FIG. 4C) at the bottom surface of the first housing 100. In an embodiment, when the flavor dispenser device 1000 is turned on (also referred to as "in operation"), the actuator actuates the first spool gear 142 through the extension shaft 206. Further, the first spool gear 142 drives the second spool gear 144 in opposite direction. One end of the second film 122 is connected to the first spool gear 142, and one end of the first film 112 is connected to the second spool gear 144. Subsequently, while the actuator is turned on, the second film 122 and the first film 112 are spooled at the first spool gear 142 and the second spool gear 144, respectively. Simultaneously, the flavor strip 114 is dispensed at the pair of splitters 164 for the subject 1002 to consume.

In an embodiment, the first housing 100 and second housing 200 are detachably coupled through one or more recess and protrusion (refer to FIGS. 2A-2C & 4C), such that the exposed area 320 of the tape cartridge 110 is positioned against the compartment 204 and compartment 202 of the second housing 200, as depicted in FIGS. 2A-2C, & 4E.

In the instance the flavor dispenser device 1000 is set to operation by the controller 1006, the LED in the compartment 202 is turned on and illuminates light so that the photoresistor in compartment 204 captures the reflection value. The light of the LED is reflected from the outer surface 113 of the first film 112. The reflection is measured by the photoresistor in the compartment 204. When a change in the measured value of reflection is identified by the controller 1006, the operation of the actuator in the second housing 200 is altered by the controller 1006.

For example, the outer surface 113 of the first film 112 is blue in color with one or more black strip 116 along the length of the tape cartridge 110. In general, the light color matching the color of the reflecting surface provides a value closest to "white". A blue color outer surface is a good reflector of light from the LED light emitting blue light, as compared to black color. Hence, when the actuator is in operation the value of reflection measured by the controller 1006 through the photoresistor in the compartment 204 is constant. Further, when the black strip 116 appears against the LED light the reflection measured by the controller 1106 through the photoresistor in the compartment 204 changes. The controller 1006 upon detecting this change in the measured reflection value may modify the operation of the actuator.

In an embodiment, the controller 1006 may turn off the actuator in the second housing 200 upon detecting the black strip 116 against the LED light in the compartment 202. Further, upon receiving an external signal, the controller may again turn on the actuator and continue its operation until a change in the measured reflection value is detected. In an embodiment, the external signal timing may be preprogrammed or stored based on the motion pictured being viewed by the subject 1002.

In an exemplary embodiment, the flavor dispenser device 1000 may be fully assembled and ready to use for a subject 1002. Further, the subject 1002 may connect the flavor dispenser device 1000 to a controller of a head mounting device 1004. Thereafter, secure the flavor dispenser device 1000 to the head mounting device 1004 as depicted in the FIG. 1. Further, the subject 1002 may adjust the feeder 160 position by holding the second housing 200, in order to align the feeder 160 with the mouth of the subject 1002. Further press the pivot button 182 to prevent the further movement of the feeder 160. Finally, once the tape cartridge is finished, the subject 1002 may lift up the first housing 100 in order to detach it from the second housing 200. Thus, the first housing 100 may be disposable upon single use. However, a new first housing 100 may be detachably connected to the same second housing 200 for subsequent use, which makes the second housing reusable and the first housing is disposed upon use.

In an embodiment, the one or more flavor strip 114 may be of a single or multiple flavor. Further, the flavor strip 114 may be attached to the tape cartridge 110 in a number of ways, which shall be easily understood by a person ordinary skilled in the art, which are with in the scope of this disclosure. In an alternative embodiment, the taste cartridge 110 may contain elevated pockets. In another alternative embodiment, the taste cartridge 110 may have a 3 layer of film, where one-layer peels back with a piece of the middle layer.

The present invention overcomes the drawbacks of the conventional solutions, by providing a flavor dispenser device to enhance the user experience of viewer. The present invention as discussed in this document with respect to different embodiments may be advantageous at least in enhancing the user experience of a viewer of motion pictures such as, but not limited to, movies, video games and other videos. This is enabled by providing a compact, inexpensive and personalized headset attachment that dispenses a customized flavor strip based on footage the viewer is watching and at appropriate time. This invention is further advantageous in providing a cartridge with flavor strips that can be delivered to the mouth of a user at an appropriate time of the motion picture content viewed by the user. The invention is further advantageous in providing a flavor film or strip dispense device that is adjustable and does not interfere with other sensory devices mounted on the same head mounting device, such as scent or smell. Additional advantages not listed may be understood by a person skilled in the art in light of the embodiments disclosed above.

Although embodiments have been described with reference to specific example embodiments, it may be evident that various modifications and changes may be made to these embodiments without departing from the broader spirit and scope of the flavor dispenser device. Accordingly, the specification and drawings are to be regarded in an illustrative rather than a restrictive sense.

Many alterations and modifications of the present invention may no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents.

What is claimed is:

1. A flavor dispenser device comprising:
   a first housing, wherein the first housing comprises:
      a tape cartridge, which includes one or more flavor strip;
      a drive mechanism to advance the tape cartridge inside the first housing,
      wherein the one or more flavor strip is dispensed from the first housing in case the drive mechanism is in operation;
   an actuator operably coupled to the drive mechanism to actuate the drive mechanism; and
   a second housing, wherein the actuator is secured in the second housing,
   wherein the second housing is detachably connected to the first housing such that the actuator is connected to the drive mechanism, and
   wherein the second housing further comprises a photoresistor and a Light Emitting Diode (LED); wherein the photoresistor and the LED are positioned against the tape cartridge when the first housing is connected to the second housing, such that the light emitted by the LED is reflected of the tape cartridge and the reflected light is received by the photoresistor.

2. A head mounting device comprising:
   a body frame to secure the head mounting device to a subject's head;
   a flavor dispenser device attached to the body frame, the flavor dispenser device comprising:
      a first housing, wherein the first housing comprises:
         a tape cartridge, which includes one or more flavor strips, and
         a drive mechanism to advance the tape cartridge inside the first housing; and
      a second housing detachably connected the first housing, the second housing comprising an actuator to actuate the drive mechanism, wherein the one or more flavor strip is dispensed from the first housing in case the drive mechanism is in operation; and
   a controller (1004) communicably connected to the actuator, wherein the controller is configured to operate the actuator.

3. The head mounting device according to claim 2, wherein the second housing further comprises a photoresistor and a Light Emitting Diode (LED); wherein the photoresistor and the LED are positioned against the tape cartridge when the first housing is connected to the second housing, such that the light emitted by the LED is reflected of the tape cartridge and the reflected light is received by the photoresistor.

4. The head mounting device according to claim 3, wherein the controller is configured to detect the change in a reflection measurement of the photoresistor; and modify the operation of the actuator.

5. The head mounting device according to claim 4, wherein the tape cartridge comprises a first film and a second film; wherein the one or more flavor strip is sandwiched between the first film and the second film; wherein the outer surface of the first film is blue in color; and wherein the outer surface of the first film comprises one or more black strip.

* * * * *